United States Patent
Vankipuram et al.

(10) Patent No.: US 12,517,991 B2
(45) Date of Patent: Jan. 6, 2026

(54) AUTHENTICATION AND CALIBRATION VIA GAZE TRACKING

(71) Applicant: HEWLETT-PACKARD DEVELOPMENT COMPANY, L.P., Spring, TX (US)

(72) Inventors: Mithra Vankipuram, Palo Alto, CA (US); Hiroshi Horii, Palo Alto, CA (US); Robert Paul Cazier, Fort Collins, CO (US); Nathan Barr Nuber, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 250 days.

(21) Appl. No.: 17/920,267

(22) PCT Filed: Apr. 21, 2020

(86) PCT No.: PCT/US2020/029074
§ 371 (c)(1),
(2) Date: Oct. 20, 2022

(87) PCT Pub. No.: WO2021/216044
PCT Pub. Date: Oct. 28, 2021

(65) Prior Publication Data
US 2023/0177128 A1 Jun. 8, 2023

(51) Int. Cl.
*G06F 21/32* (2013.01)
*G06F 3/01* (2006.01)
*G06F 21/31* (2013.01)

(52) U.S. Cl.
CPC .............. *G06F 21/32* (2013.01); *G06F 3/013* (2013.01); *G06F 21/316* (2013.01)

(58) Field of Classification Search
CPC ........ G06F 21/32; G06F 3/013; G06F 21/316; G06F 3/011; H04L 2463/082; H04L 63/0861
See application file for complete search history.

(56) References Cited

U.S. PATENT DOCUMENTS

| | | | |
|---|---|---|---|
| 9,092,600 B2 | 7/2015 | Scavezze et al. | |
| 10,063,560 B2 | 8/2018 | Gordon et al. | |
| 10,075,492 B2* | 9/2018 | Kawakubo | H04N 21/4788 |
| 2012/0144449 A1* | 6/2012 | Peled | G06F 21/6245 726/1 |
| 2014/0055591 A1* | 2/2014 | Katz | G06F 21/32 348/78 |

(Continued)

FOREIGN PATENT DOCUMENTS

| | | |
|---|---|---|
| EP | 3318178 A1 | 5/2018 |
| TW | 201723913 A | 7/2017 |
| WO | WO-2016090379 A2 * 6/2016 | ............. G06F 21/32 |

*Primary Examiner* — Kambiz Zand
*Assistant Examiner* — Afaq Ali
(74) *Attorney, Agent, or Firm* — Quarles & Brady LLP

(57) ABSTRACT

In an example in accordance with the present disclosure, a system is described. The system includes a display device and a gaze tracking system to capture eye movements of a user looking at the display device. The system also includes a controller. The controller authenticates the user based on eye movements of the user matching an eye movement authentication pattern. The controller also calibrates a computing device based on the eye movements of the user.

19 Claims, 10 Drawing Sheets

(56) References Cited

U.S. PATENT DOCUMENTS

| | | | |
|---|---|---|---|
| 2014/0126782 A1* | 5/2014 | Takai | G06F 3/013 |
| | | | 382/116 |
| 2014/0289834 A1* | 9/2014 | Lindemann | G06Q 20/425 |
| | | | 726/7 |
| 2014/0331315 A1* | 11/2014 | Birk | G06F 21/36 |
| | | | 726/19 |
| 2014/0333665 A1* | 11/2014 | Sylvan | G02B 7/12 |
| | | | 345/633 |
| 2015/0135309 A1 | 5/2015 | Karmarkar et al. | |
| 2015/0227735 A1 | 8/2015 | Chappell | |
| 2015/0293586 A1* | 10/2015 | Kritt | G06F 3/013 |
| | | | 345/158 |
| 2015/0302252 A1 | 10/2015 | Herrera | |
| 2017/0109513 A1* | 4/2017 | Skogö | G06V 40/20 |
| 2017/0154177 A1* | 6/2017 | Tsou | G06V 40/11 |
| 2017/0318019 A1 | 11/2017 | Gordon et al. | |
| 2017/0336867 A1 | 11/2017 | Wilairat et al. | |
| 2018/0232507 A1* | 8/2018 | Zizi | G06V 40/19 |
| 2020/0019763 A1* | 1/2020 | Iyer | G06F 18/22 |
| 2020/0089855 A1 | 3/2020 | Chou et al. | |
| 2020/0092092 A1 | 3/2020 | Zhao | |
| 2020/0236539 A1* | 7/2020 | Santos | H04W 12/02 |
| 2020/0250284 A1* | 8/2020 | Diehl | G06F 21/32 |

* cited by examiner

AUTHENTICATION AND CALIBRATION VIA GAZE TRACKING

BACKGROUND

Computing systems provide access to numerous pieces of information and numerous computing applications. For example, via computing devices and networks, users can access information and applications anywhere across the globe. In some examples, the information or application a user is attempting to access is located on a remote server and access is made via a network. In other examples, the information is stored locally on the computing device.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
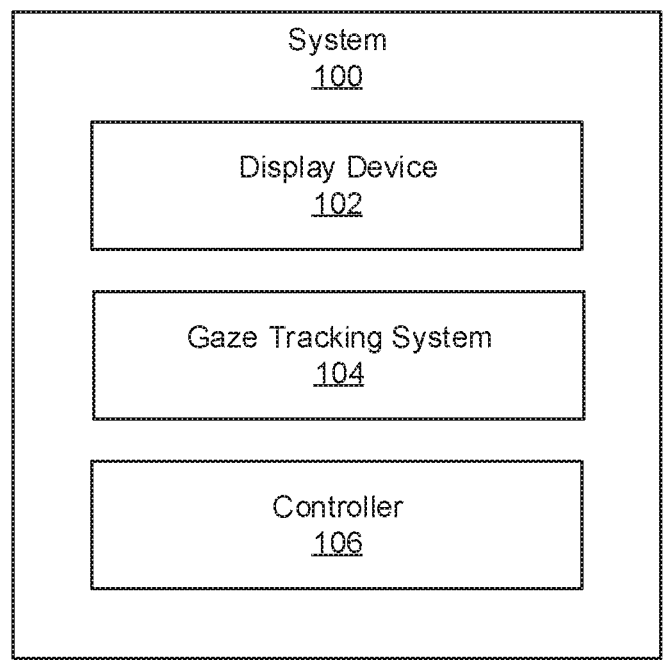
FIG. 1 is a block diagram of a system for authenticating a user and calibrating a computing device using gaze tracking, according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

As described above, computing devices provide access to data and applications to users. Such informational exchange is independent of geographic boundaries and may be portable. For example, a user may access certain information stored on their home computing device even when they are not at home, for example through their mobile device. Similarly, a user may access information that is not stored locally, such as bank account information, from their home computing device and/or their phone. Similarly, applications that are stored at one location may be accessed by a user at an entirely different location.

Clearly, the global nature of information exchange provides countless benefits to users of those computing devices as information has become more widespread and portable. Certain developments may increase the security of this data.

That is, as digital data storage opportunities have increased over the years, so too has the risk that such data may be hacked by malicious and nefarious parties. For example, a hacker may gain unauthorized access to information located on a server, which information may be personal, sensitive or otherwise confidential.

Accordingly, the present specification describes systems and methods that enhance the security of computing resources such as data and/or applications. Specifically, the system includes a gaze tracking system that follows a user's eyes across a display device. Prior to logging in, a user may set an eye movement authentication pattern. Such an eye movement authentication pattern may define a sequence of different regions on the display screen that the user is looking at. During authentication, a user may be presented with an interface that allows them to look at different regions of the display screen. If the user's eye movements during authentication match those as defined by the eye movement authentication pattern, a user is granted access to the data and/or applications. Accordingly, such a system provides a unique method to specifically identify a user attempting access to computing resources.

In one particular example, the authentication process described above may be implemented in enhanced reality systems. Enhanced reality systems allow a user to become immersed in an enhanced reality environment wherein they can interact with the enhanced environment. Enhanced reality systems include virtual reality (VR) systems, augmented reality (AR) systems, and mixed reality (MR) systems. Such enhanced reality systems can include enhanced reality headsets to generate realistic images, sounds, and other human discernable sensations that simulate a user's physical presence in a virtual environment presented at the headset. A VR system includes physical spaces and/or multi-projected environments. AR systems may include those systems and devices that implement live direct and/or indirect displays of a physical, real-world environment whose elements are augmented by computer-generated sensory input such as sound, video, graphics and/or GPS data. MR systems merge real and virtual worlds to produce new environments and visualizations where physical and digital objects co-exist and interact in real time. For simplicity, VR systems, AR systems, and MR systems are referred to herein as enhanced reality systems.

Such enhanced reality systems may be used to access the information and applications as described above, via an authentication process. However, this process may be cumbersome as a user may have to remove the headset to enter authentication credentials. For example, a user may take the headset off, log in via a browser to authenticate and gain access, and don the headset again to use different applications and/or access the data. Accordingly, the present specification describes a gaze-tracking authentication operation that avoids the potentially cumbersome and repeated process of taking on and off the headset to enter authentication credentials.

Moreover, in some examples, the enhanced reality headset goes through a calibration phase which ensures that eye movements are properly tracked in the enhanced reality system and that accurate interpretations are made of eye movements. The present specification joins the authentication via gaze tracking into this calibration phase to reduce log in friction for the end user. For example, to calibrate the enhanced reality system, a user moves their eyes in a predetermined fashion. As described above, in the present specification, the movement of the eyes that are used to calibrate the enhanced reality system are user-defined and unique, thus serving as an authentication process as well. That is, during a login, a user may be prompted to enter an eye movement authentication pattern. The movement of the user's eyes during this authentication operation may be used to calibrate the enhanced reality system.

Users of enhanced reality headsets range in domains from healthcare, to design, to location-based entertainment. In these use cases, users may go through an authentication process to gain access to different applications and/or data. As mentioned earlier, entry of username and password is not friction-free. In particular, in an example where a user is donning an enhanced reality headset, the current systems and methods reduce friction by integrating parts of the authentication process into eye-tracker calibration phase, thus leading to a better user experience for end users.

Specifically, the present specification describes a system. The system includes a display device and a gaze tracking system to capture eye movements of a user looking at the display device. The system also includes a controller. The controller authenticates the user based on eye movements of the user matching an eye movement authentication pattern. The controller also calibrates an associated computing device based on the eye movements of the user.

The present specification also describes a method. According to the method, user eye movements towards a display device are tracked in a first mode to define an eye movement authentication pattern. In a second mode, a user of the display device is authenticated based on eye movements of the user matching the eye movement authentication pattern. Also, in the second mode, an associated computing device is calibrated based on the eye movements of the user.

The present specification also describes a non-transitory machine-readable storage medium encoded with instructions executable by a processor. The machine-readable storage medium includes instructions to, in a first mode, 1) track user eye movements towards a display device to define an eye movement authentication pattern and 2) receive user input to define supporting authentication credentials from a second authentication system. The machine-readable storage medium includes instructions to, during login, authenticate a user by 1) matching user eye movements to the eye movement authentication pattern and 2) matching user input to the supporting authentication credentials. During authentication, the instructions calibrate an associated computing device based on the eye movements of the user during login.

In summary, using such a system May 1) authenticate a user to increase data security; 2) authenticate during calibration; 3) facilitate authentication without removing an enhanced reality headset; and 4) provide hands-free user authentication. However, it is contemplated that the devices disclosed herein may address other matters and deficiencies in a number of technical areas.

As used in the present specification and in the appended claims, the term "a number of" or similar language is meant to be understood broadly as any positive number including 1 to infinity.

Turning now to the figures, FIG. 1 is a block diagram of a system (100) for authenticating a user and calibrating a computing system using gaze tracking, according to an example of the principles described herein. In general, the system (100) may be disposed on any variety of computing devices. Such computing devices include mobile phones, desktop computers, laptop computers, tablet devices, gaming systems, smart home devices, and others. In one particular example, the system (100) is disposed in an enhanced reality system. That is the gaze tracking system (104) may be disposed within an enhanced reality headset donned by a user. In another particular example, the system (100) is disposed in a computing device in a vehicle. That is, the system (100) including the gaze tracking system (104) may be in a vehicle dashboard to track a driver's eye movements.

Figure 2:
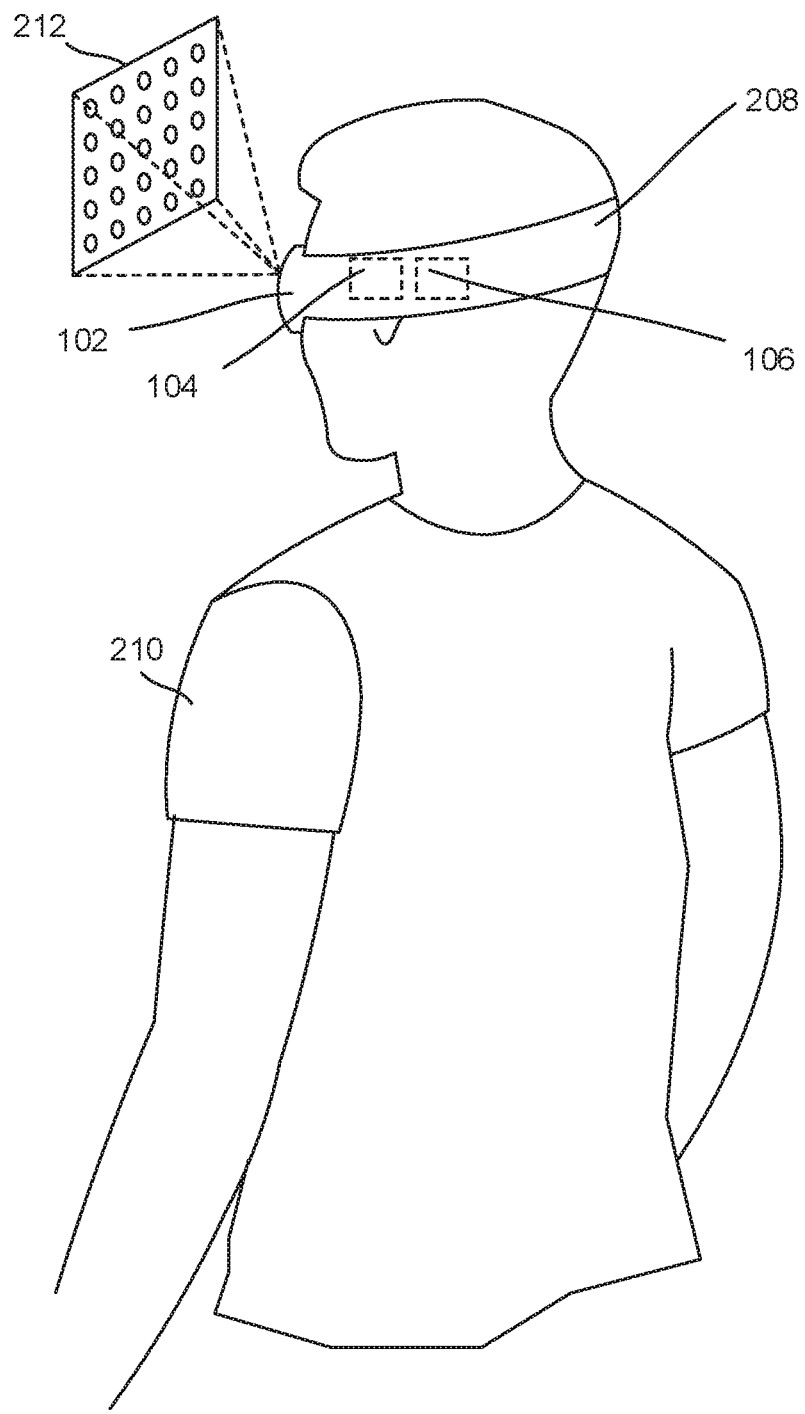
FIG. 2 is a diagram of a user donning an enhanced reality headset which authenticates and calibrates via gaze tracking, according to an example of the principles described herein.

The system (100) may include a display device (102). A display device (102) refers to any device that presents visual information to a user. Examples of display devices include computer screens, smart device screens, tablet screens, and mobile device screens. In one particular example, the display device (102) is formed in a headset that is worn by a user when using an enhanced reality system. An example of such a headset is depicted in FIG. 2 below.

The system (100) includes a gaze tracking system (104) to capture eye movements of a user looking at the display device (102). In general, the gaze tracking system (104) is an electronic system that detects and reports at least one user's gaze direction in one or both eyes. The user's gaze direction may refer to the direction of a gaze ray in three-dimensional (3D) space that originates from near or inside the user's eye and indicates the path along which their foveal retina region is pointed. That is, the gaze tracking system (104) determines where a user is looking. In some examples, the gaze tracking system (104) reports the gaze direction relative to the object on which the gaze terminates. For example, the gaze tracking system (104) may determine what part of the display device (102) the user is looking at. In enhanced reality head mounted displays or other virtual display systems, the gaze ray may be projected into a virtual space that is displayed in front of the user's eye, such that the gaze ray terminates at some virtual point behind the display device (102). In some examples, the gaze tracking system (104) tracks the gaze of more than one user at a time.

The gaze tracking system (104) may detect the eye's orientation and position in a variety of ways. In one example, the gaze tracking system (104) observes the eye using an infrared or visible light camera. The position of the eye anatomy within the camera's image frame can be used to determine where the eye is looking. In some examples, illuminators are used to create reflective glints on the eye's anatomy, and the position of the glints is used to track the eye. In these examples, entire patterns of light can be projected onto the eye, both through diffuse or point illuminators like standard LEDs, collimated LEDs, or low powered lasers.

In some examples, the gaze tracking system (104) is integrated onto the display device (102). For example, on a desktop computer or mobile phone, a camera could be directed towards the user to track their eye movement and position. In another example, in an enhanced reality headset, the gaze tracking system (104) may be formed on a same surface of an internal part of the housing that the display device (102) is formed and may point towards the user's face.

As used in the present specification and in the appended claims, the term, "controller" refers to various hardware components, which includes a processor and memory. The processor includes the hardware architecture to retrieve executable code from the memory and execute the executable code. As specific examples, the controller as described herein may include computer-readable storage medium, computer-readable storage medium and a processor, an application-specific integrated circuit (ASIC), a semiconductor-based microprocessor, a central processing unit (CPU), and a field-programmable gate array (FPGA), and/or other hardware device.

The memory may include a computer-readable storage medium, which computer-readable storage medium may contain, or store computer-usable program code for use by or in connection with an instruction execution system, apparatus, or device. The memory may take many types of memory including volatile and non-volatile memory. For example, the memory may include Random Access Memory (RAM), Read Only Memory (ROM), optical memory disks, and magnetic disks, among others. The executable code may, when executed by the respective component, cause the component to implement at least the functionality described herein.

The controller (106) of the system (100) authenticates the user based on eye movements of the user matching an eye movement authentication pattern. That is, as described above, the eye movement authentication pattern defines a set of eye movements that grant a user access to certain data and/or applications. In some examples, this eye movement authentication pattern may be user-defined. That is, during a setup phase, the user may be prompted to generate the eye movement authentication pattern by looking at different areas of the display device (102). In some examples, visual reference may be displayed and the user may look at different cues on the visual reference. For example, the visual reference may be a grid of dots and the user may look at the dots in a desired sequence. The movements the user's eyes go through to view the dots in the sequence, forms the eye movement authentication pattern. Accordingly, the gaze tracking system (104) determines the movement of the eyes as the user looks at a sequence of dots and the controller (106) sets these eye movements as the eye movement authentication pattern. Then, during login, the gaze tracking system (104) again tracks eye movements of the user and the controller (106) receives tracked movements and compares them to determine if they match the eye movement authentication pattern. If they do, the controller (106) authenticates the user and grants access to the information, data, and/or applications. By comparison, if they do not match, the controller (106) prevents the user from accessing the information, data, and/or applications.

The controller (106) also calibrates the associated computing device based on eye movements of the user. Calibration refers to the process wherein the characteristics of a user's eye position and eye movements are mapped to ensure accurate gaze tracking. For example, different users have different eye physical properties and inter pupillary distance (IPD). Accordingly, the gaze tracking system (104) is calibrated for each user. That is, the gaze tracking system (104) and applications or program instructions executed thereon may operate improperly and may not properly track eye movements if not calibrated. Calibration is used if there is a change to an IPD on account of there being a new user or the position of an enhance reality headset on a user. In other words, calibration information is used as reference data such that the gaze tracking system (104) can accurately measure characteristics of the eye to determine position and/or movement. This calibration information is also used to ensure that the full display device (102) is available for use.

To calibrate the gaze tracking system (104), associated computing device, and any applications/program instructions running on either device, the controller (106) may generate a visual reference and direct the user to look at different points. From the information collected as the user looks at the different points, the gaze tracking system (104) and associated computing device may be calibrated.

In some examples, the authentication and calibration are performed simultaneously. That is, as the user's eyes move through the motions to provide the eye movement authentication credentials, the controller (106) may pass the eye movement data to a system that calibrates the gaze tracking system (104) and the associated computing device. In other words, the calibration pattern used to calibrate the gaze tracing system (104) may be user-defined and may be unique to a particular user such that when kept confidential from other users, is a way to ensure a particular user, and not some nefarious and malicious third party, is attempting to access the secure data and/or applications.

Accordingly, the present specification describes a system (100) wherein a user, via a single eye movement pattern, can both authenticate themselves to access the data and calibrate the gaze tracking system (104) to provide a correct and accurate immersive experience.

In other examples, the authentication and calibration are performed separately. For example, the system (100) may save calibration information, such as eye physical dimensions, and IPD. Then when a user authenticates via the gaze tracking system (104), the controller (106) calls the calibration information associated with the user to calibrate the gaze tracking system (104) and/or the associated computing device.

In some examples, the system (100) may operate on multiple users simultaneously. For example, a gaze tracking system (104) may be disposed on a television, and each user could simultaneously enter the eye movement authentication pattern, which may be the same for each user or different for each user. As described above, the controller (106) recognizes the eye movement authentication pattern to authenticate the users.

FIG. 2 is a diagram of an enhanced reality headset (208) for authenticating and calibrating via gaze tracking, according to an example of the principles described herein. As described above, the system (FIG. 1, 100) may be formed in an enhanced reality system. Accordingly, the display device (102) may be a head mounted display device that is worn by a user (210) to generate visual, auditory, and other sensory environments, to detect user input, and to manipulate the environments based on the user input. While FIG. 2 depicts a particular configuration of the enhanced reality headset (208), any type of enhanced reality headset (208) may be used in accordance with the principles described herein.

FIG. 2 also depicts dashed boxes representing the controller (106) and the gaze tracking system (104). While FIG. 2 depict these components disposed on the enhanced reality headset (208), either of these components may be placed on another device. For example, the controller (106) may be found on a different computing device. That is, the enhanced reality headset (208) is communicatively coupled to a host computing device such that execution of computer readable program code by a processor associated with the host computing device causes a view of an enhanced reality environment to be displayed in the enhanced reality headset (208). In some examples, the controller (106) of the system (FIG. 1, 100) may be disposed on this host computing device.

In some examples, the enhanced reality headset (208) implements a stereoscopic head-mounted display that provides separate images for each eye of the user. In some examples, the enhanced reality headset (208) may provide stereo sound to the user. In an example, the enhanced reality headset (208) may include a head motion tracking sensor that includes a gyroscope and/or an accelerometer.

As described above, via the display device (102) and the gaze tracking system (104), a user (210) may be authenticated via tracking movements of the eye during login/authentication and comparing those movements to an eye movement authentication pattern. In some examples, the display device (102) displays an eye movement visual reference (212). Such an eye movement visual reference (212) provides confirmation of the eye position and movement of the eye. In the example depicted in FIG. 2, the eye movement visual reference (212) is a grid of dots, however the eye movement visual reference (212) may take other forms. For example, the eye movement visual reference (212) may be a secret image where the user (210) looks at different parts of an image.

In some examples, the enhanced reality headset (208) may detect when a user takes on/off the enhanced reality headset (208) and the system (FIG. 1, 100) may take appropriate action. For example, when taken off, the system (FIG. 1, 100) may re-trigger the authentication process and end a current session. In this example, the system (FIG. 1, 100) may include an inertial measurement unit or other motion sensing unit to detect when the enhanced reality headset (208) is taken off completely (not just resting on the head). The same sensing unit may be used to determine when the enhanced reality headset (208) is put back on a user head.

The system (FIG. 1, 100) may also identify the user of the enhanced reality headset (208) and may prompt the eye movement authentication pattern associated with that user. That is, as described above, the eye movement authentication pattern may be unique per user. The controller (FIG. 1, 106) may identify the user and may call the eye movement authentication pattern for that user.

In one particular example, this may be done by identifying an iris of a user. In this example, the system (FIG. 1, 100) could generate a textual/visual notification that the user has been identified. For example, the system (FIG. 1, 100) may generate a visual/auditory prompt stating, "Hello John. You are back. Enter your eye movement authentication pattern to log back in." In other examples, rather than using identification via the eye of a user, a user may enter another form of authentication credentials such as a voice ID or touch ID to indicate who they are.

As described above, the eye movement authentication pattern is user-specific and so may be transferable to other devices. In this example, the eye movement authentication pattern is associated with supporting authentication credentials (such as voice ID, touch ID, or password) such that the eye movement authentication pattern is retrieved on any device where supporting authentication credentials are input. For example, if the user switches to a different enhanced reality headset (208), the user may input their voice ID or touch ID. The system (FIG. 1, 100) may uniquely identify them from a database of users. After this, the system (FIG. 1, 100) logs the device name in the user's account and creates encrypted information that includes their unique eye movement authentication pattern which allows them to login. In some examples, the system (FIG. 1, 100) associates the eye movement authentication pattern with the new device ID so the next time they use the device, they can provide username via user name voice ID or touch ID.

Figure 3:
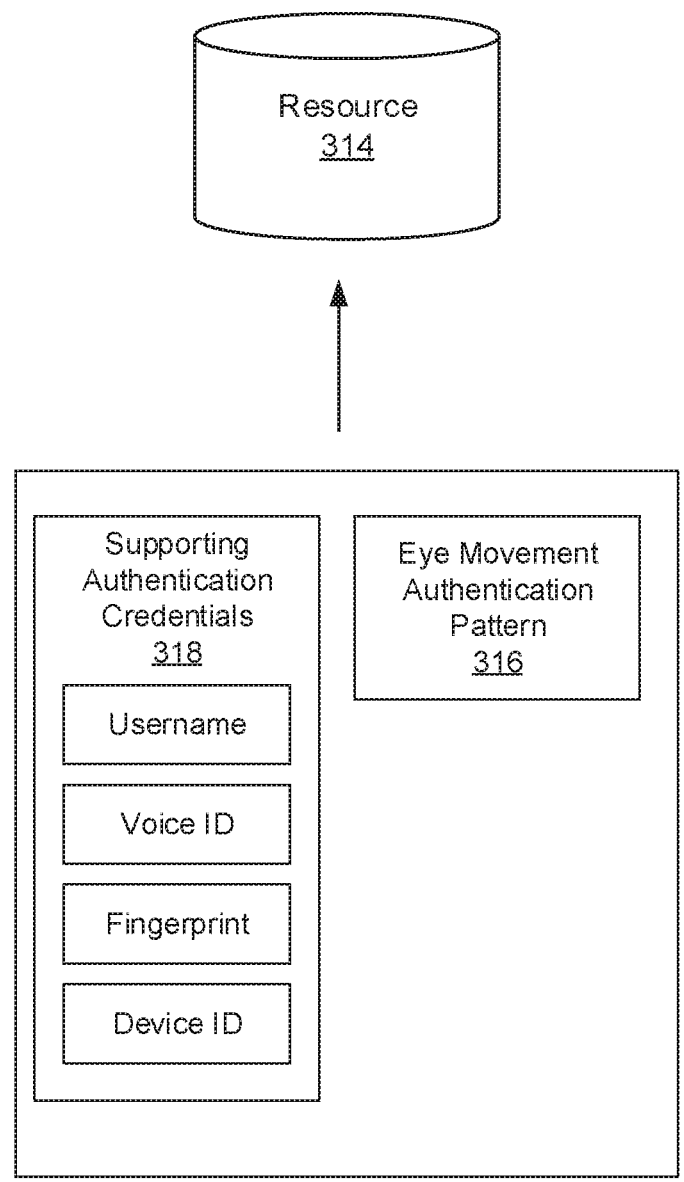
FIG. 3 is a block diagram of a system for granting access based on authentication via gaze tracking, according to an example of the principles described herein.

FIG. 3 is a block diagram of a system for granting access based on authentication via gaze tracking, according to an example of the principles described herein. As described above, the system (FIG. 1, 100) uses an eye movement authentication pattern (316) to provide access to a resource (314). The resource (314) may be data, applications, or other computing resources. As described above, the resource (314) may be local to a computing device. For example, a user may wish to access a database on their local computing device. In another example, the resource (314) may be remote. For example, a user may try to access a website such as a banking website that stores banking information remotely.

As described above, the eye movement authentication pattern (316) may be used to authenticate the user to ensure they have rights to access the resource (314). In some examples, the eye movement authentication pattern (316) may be used in conjunction with supporting authentication credentials (318), for example to provide multi-factor authentication. The supporting authentication credentials (318) may be of a variety of types including a username, voice identifier, fingerprint, or device identifier. In these examples, to access the resource (314), a user is authenticated via both mechanisms. That is, a user provides a username, voice identifier, fingerprint, or device identifier that matches a database of authorized entities and also provides an eye movement that matches the eye movement authentication pattern (316).

Such dual-mode authentication increases the security of the data/applications a user is attempting to access. That is, given that users are looking at a pattern of points, there may be a finite set of distinct patterns for a given grid of points. Accordingly, as the number of users increases, the probability that two users have the same pattern increases. By combining a pattern information with local information, i.e., touch ID, voice ID, or device ID, data security is enhanced as it's less likely that two users of the same device have the exact same pattern. Thus, the present system (FIG. 1, 100) further enhances the security of the resource (314).

Figure 4:
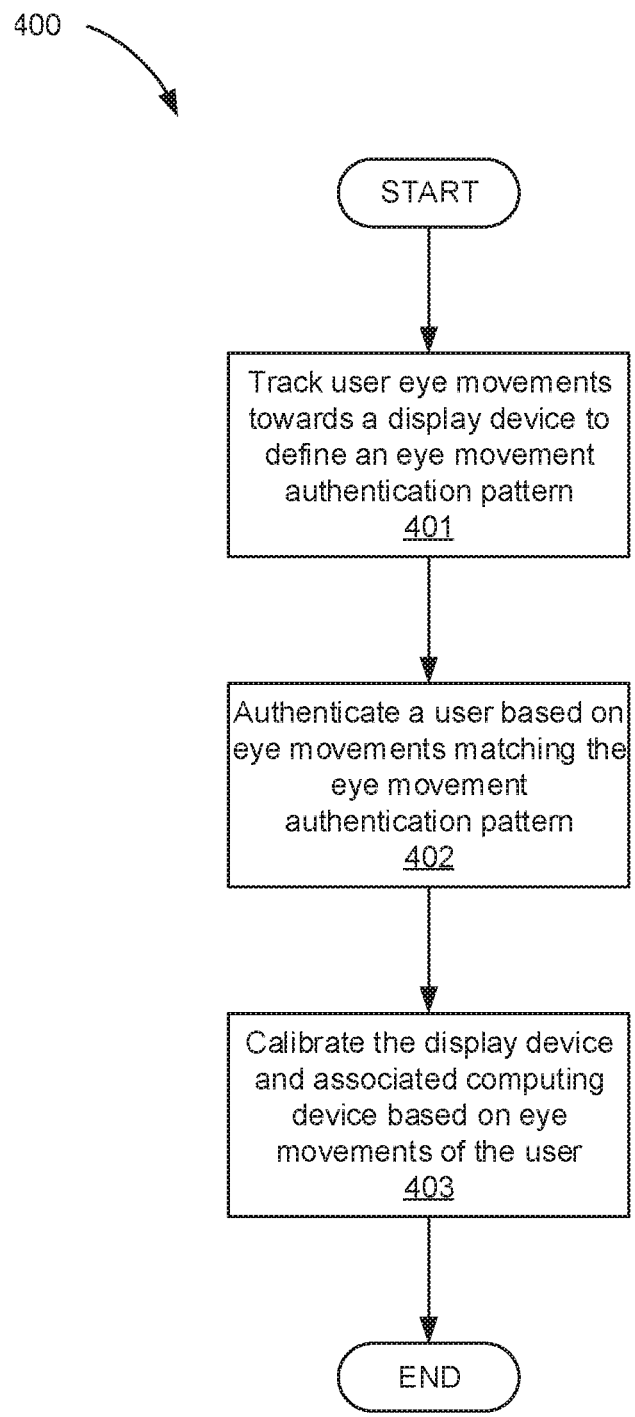
FIG. 4 is a flowchart of a method for authenticating and calibrating via gaze tracking, according to an example of the principles described herein.

FIG. 4 is a flowchart of a method (400) for authenticating and calibrating via gaze tracking, according to an example of the principles described herein. In the example depicted in FIG. 4, the system (FIG. 1, 100) operates in different modes. In a first mode, the system (FIG. 1, 100) receives user input to establish the eye movement authentication pattern (FIG. 3, 316) and in a second mode, such as a login or authentication operation, the system (FIG. 1, 100) receives user input and determines whether it matches the eye movement authentication pattern (FIG. 3, 316).

Accordingly, in the first mode, the method (400) includes tracking user eye movements towards a display device (FIG. 1, 102) to define an eye movement authentication pattern (FIG. 3, 316). That is, as described above the gaze tracking system (FIG. 1, 104) can discriminate where on a display device a user's eyes are directed. Accordingly, the system (FIG. 1, 100) may enter a mode where eye positions and movements are tracked and recorded. That is, the gaze tracking system (FIG. 1, 104) captures eye movements to define the eye movement authentication pattern (FIG. 3, 316). Also, during this first mode, the controller (FIG. 1, 106) establishes the eye movement authentication pattern (FIG. 3, 316). That is, the sequence of eye movements recorded by the gaze tracking system (FIG. 1, 104) are formally defined as the eye movement authentication pattern (FIG. 3, 316) and stored for subsequent authentication of a user.

At another point in time, that is when a user, be it the same user that established the eye movement authentication pattern (FIG. 3, 316) or another user, the system (FIG. 1, 100)

calls the eye movement authentication pattern (FIG. 3, 316) to ensure the user attempting to access the resource (FIG. 3, 314) has rights to do so. Accordingly, in a second mode such as login or authentication, the method (400) includes authenticating (block 402) a user of the display device (FIG. 1, 102) based on eye movements of the user matching the eye movement authentication pattern (FIG. 3, 316). That is, a login screen may be presented to a user prior to the user accessing a resource (FIG. 3, 314), whether that resource (FIG. 3, 314) be data, applications, services, and/or computing hardware resources. Via the login screen, the user is prompted to enter a validating eye movement authentication pattern (FIG. 3, 316). If the eye movements of the user match the eye movement authentication pattern (FIG. 3, 316) the user is granted access. By comparison, if the eye movements of the user do not match the eye movement authentication pattern (FIG. 3, 316), access is denied.

Concurrently with capturing eye movements to compare against an eye movement authentication pattern (FIG. 3, 316), the system (FIG. 1, 100) may capture eye movements to calibrate (block 403) the gaze tracking system (FIG. 1, 104), any associated computing device, and applications/program instructions that may be running on the gaze tracking system (FIG. 1, 104) and/or the associated computing device. That is, to ensure accurate tracking of user eye movement and to ensure proper interpretation and responses to eye movement, the computing device of which the gaze tracking system (FIG. 1, 104) is a part and the gaze tracking system (FIG. 1, 104) itself, are calibrated. This may be done as the user's eyes are tracked during gaze authentication.

Put another way, the gaze tracking system (FIG. 1, 104) and user authentication rely on tracking eye movements. The present system (FIG. 1, 100) and method (400) simultaneously perform these operations. Doing so provides a simpler login process as a user can perform authentication without taking off an enhanced reality headset (FIG. 2, 208) for example and can perform authentication and calibration through a single operation, rather than through distinct and separate operations.

A specific example of the first mode and second mode of operation of the system (FIG. 1, 100) is now provided in which the system (FIG. 1, 100) is incorporated in an enhanced reality headset (FIG. 2, 208). During a first mode, i.e., a first-time registration, a user may login in with a virtual keyboard using their controllers. At this time, he/she can be walked through a one-time set up of enhanced reality authentication. During this set up, a user creates their own personal eye movement authentication pattern (FIG. 3, 316) from a grid that is shown. In some examples, there may be certain criteria for establishing the eye movement authentication pattern (FIG. 3, 316). For example, the system (FIG. 1, 100) may proscribe that dots from particular regions of the display be used in an eye movement authentication pattern (FIG. 3, 316). Doing so may ensure that a generated eye movement authentication pattern (FIG. 3, 316) is able to be used for system calibration.

In addition, the user may also provide information to establish a supporting authentication credential (FIG. 3, 318) such as an audio sample of their name. For example, "John Smith" repeated multiple times to get samples for future detection. In another example with a touchpad, a user may provide a touch identifier by touching the sensor. As yet another example, a device identifier may be retrieved during this set up. In this example, the device identifier is automatically obtained from the enhanced reality headset (FIG. 2, 208).

During the second mode, i.e., during authentication, when the supporting authentication credential (FIG. 3, 318) is a voice identifier, a user may state their name. When the supporting authentication credential (FIG. 3, 318) is a touch identifier, the user may use a touchpad. In either example, following authentication via a supporting authentication credential (FIG. 3, 318), a user may be shown a grid that is the eye-tracker calibration routine. The computer expects the user-defined eye movement authentication pattern.

For additional security the device ID can be used to decrypt a password and combine it with the username or user's name voice ID. Naively, to encrypt the password, the hashing function (derived from device ID) may be used with the device ID as a key. By using device ID to generate the hashing function, a narrow latent space is created where passwords exist. By knowing the device ID, the inverse function can be used to derive a smaller set of password patterns that may be linked to a particular device and authentication in that space.

In the event that a user fails authentication, the system (FIG. 1, 100) may fall back to a virtual keyboard with controllers to enter username and password while in VR, or a user may remove the enhanced reality headset (FIG. 2, 208) and login via the desktop experience.

Figure 5A:
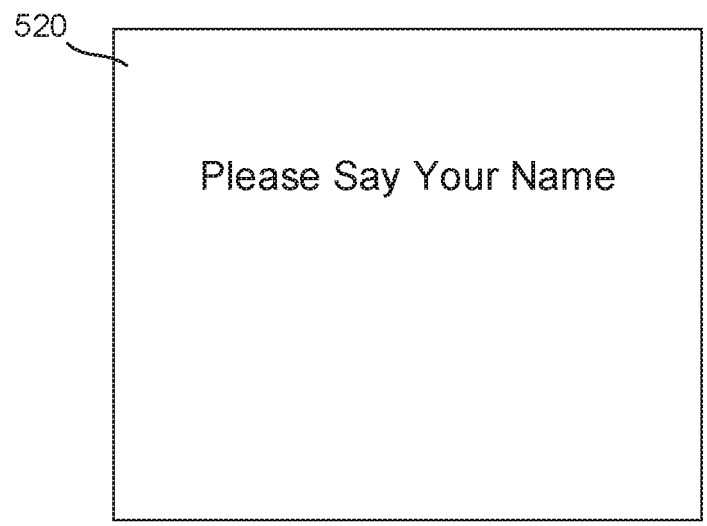
FIGS. 5A-5E are screenshots of authenticating and calibrating via gaze tracking, according to an example of the principles described herein.
Figure 5B:
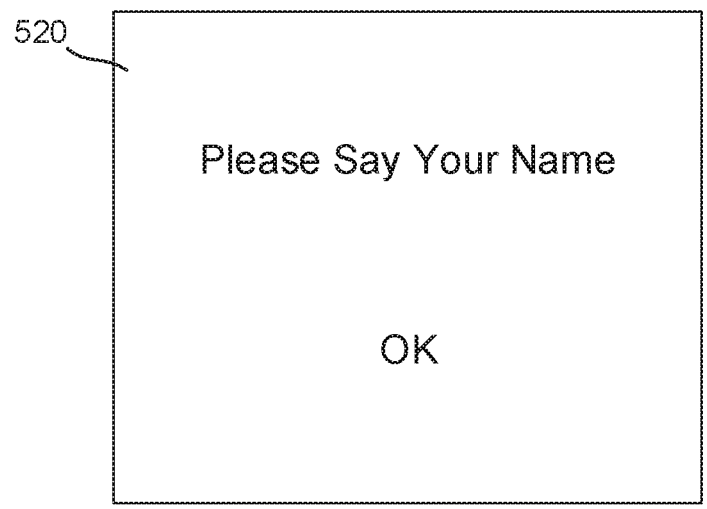

FIGS. 5A-5E are screenshots of authenticating and calibrating via gaze tracking, according to an example of the principles described herein. That is, FIGS. 5A-5E depict operation of the system (FIG. 1, 100) in a second, or login, mode. At a first screen, a user is prompted to enter a supporting authentication credential (FIG. 3, 318). In the example depicted in FIG. 5a, the supporting authentication credential (FIG. 3, 318) is a voice identifier as indicated by the prompt to "Please Say Your Name." Accordingly, a user may state their name. As depicted in FIG. 5B, following authentication via a second authentication system, an indication is provided to a user that they have provided an authenticated credential.

Figure 5C:
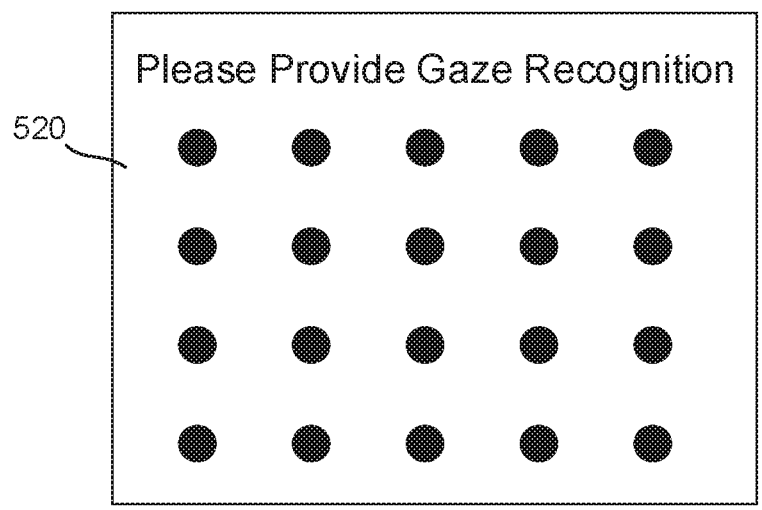

Responsive to providing an authenticated credential, the system (FIG. 1, 100) initiates authentication via gaze tracking. In this example, the system (FIG. 1, 100) displays an eye movement visual reference as depicted in FIG. 5C. That is, without such a reference it may be difficult for a user to know if their eye registration is accurately tracked. Accordingly, the eye movement visual reference provides visual cues or references that a user may follow when attempting to authenticate via gaze tracking. A similar visual reference may be provided during the first mode when the user is defining the eye movement authentication pattern (FIG. 3, 316). Note that FIGS. 5C and 5D depict one example of an eye movement visual reference, but other examples such as images, or a sequence of images in a pattern may also be implemented.

Figure 5D:
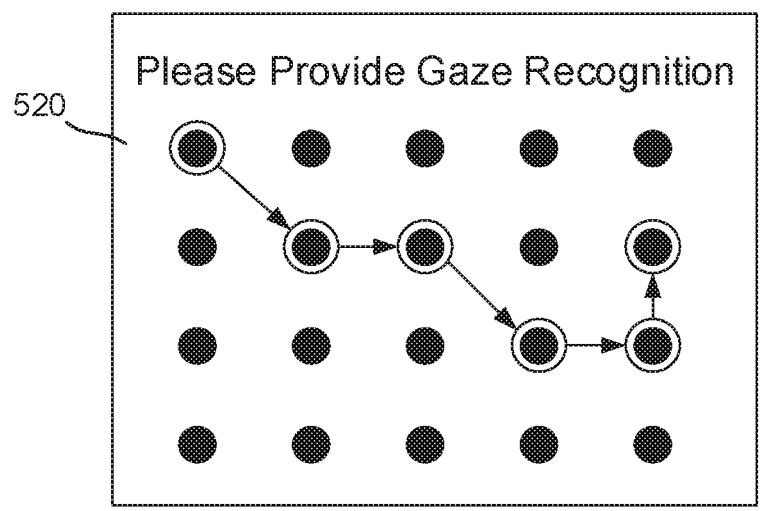

As depicted in FIG. 5D, the user then moves their eyes in a predetermined pattern. As depicted in FIG. 5D, visual indication may be provided of the eye movement. That is, those grid points that are recorded as being the focus of a user's eyes are encircled about by a highlighting indicator. Thus, a user may recognize at which point on the screen is registered as being a focus of their gaze. Note that in some examples, this visual indication of a user's gaze, i.e., the highlighting indicator, may be prevented from being displayed altogether or may be prevented from being displayed to a mirroring device.

Figure 5E:
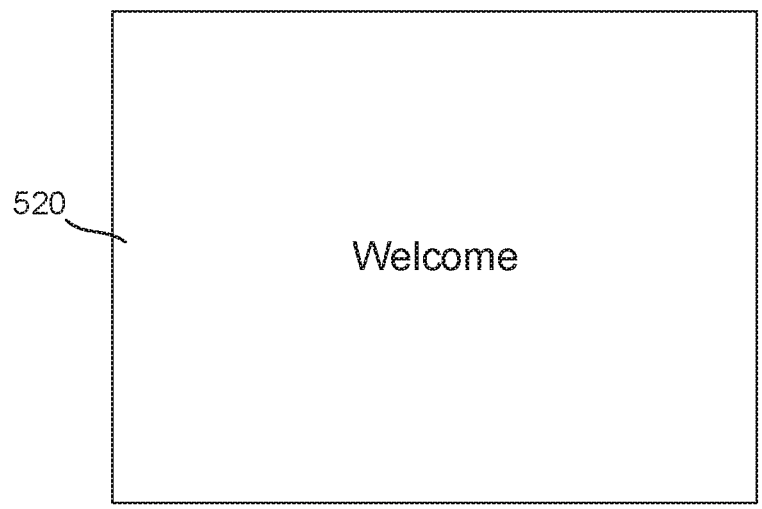

Then as depicted in FIG. 5E, if the user eye movement matches the eye movement authentication pattern (FIG. 3, 316) a screen (520) is presented that indicates the user is authenticated to access the resource (FIG. 3, 314), whatever that resource (FIG. 3, 314) may be.

Note that while FIGS. 5A-5E depict a particular order between authentication via the supporting authentication credentials (FIG. 3, 318) and the eye movement authentication pattern (FIG. 3, 316), any order may be implemented. That is, authenticating the user may include authenticating the user based on user input matching supporting authentication credentials (FIG. 3, 318) and in one example authenticating the user of the display device (FIG. 1, 102) based on eye movements of the user matching the eye movement authentication pattern (FIG. 3, 316) is responsive to the user input matching the supporting authentication credentials (FIG. 3, 318). However, in another example, authenticating the user based on the user input matching supporting authentication credentials (FIG. 3, 318) is responsive to eye movements of the user matching the eye movement authentication pattern (FIG. 3, 316).

Figure 6:
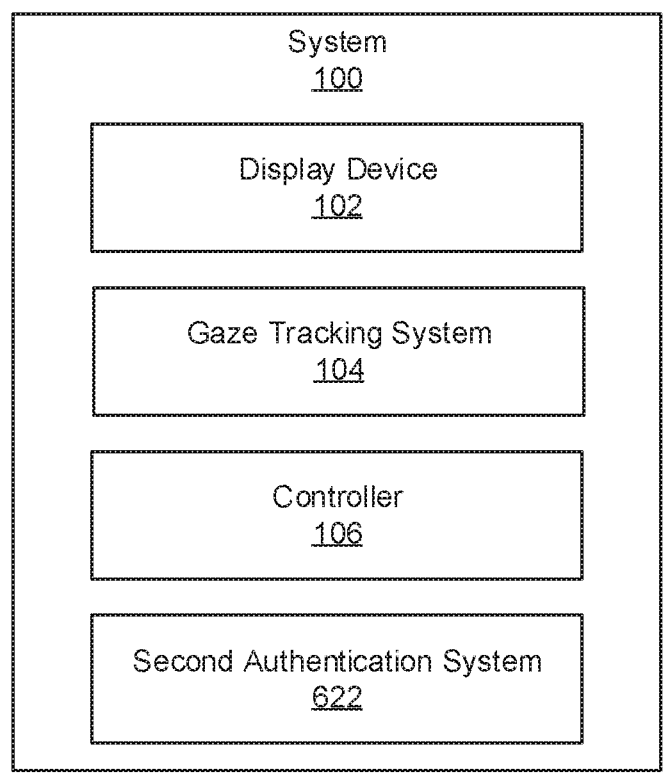
FIG. 6 is a block diagram of a system for authenticating a user and calibrating a computing system using gaze tracking, according to an example of the principles described herein.

FIG. 6 is a block diagram of a system (100) for authenticating a user and calibrating a computing system using gaze tracking, according to an example of the principles described herein. The system depicted in FIG. 6 includes a display device (102), gaze tracking system (104), and controller (106) as depicted in FIG. 1. The system (100) includes additional components to authenticate a user. Specifically, the system (100) may include a second authentication system (622). That is, as described above, the eye movement authentication pattern (FIG. 3, 316) may be used in combination with other authentication credentials (FIG. 3, 318) in a multi-factor authentication system to further increase the security of data, applications, and/or computing resources. During the first mode, that is when a user is registering, the second authentication system (622) receives user input to establish supporting authentication credentials (FIG. 3, 318) and during login, the controller (106) further authenticates the user based on input matching the supporting authentication credentials (FIG. 3, 318). In some examples, the second authentication system (622) may present an interface wherein a user can setup and be authenticated via a username.

In another example, the second authentication system (622) is a biometric authentication system. That is, the second authentication system (622) may authenticate via physical distinguishing attributes of a user. In one example, a biometric second authentication system (622) uses a user's voice print to authenticate the user. In this example, the second authentication system (622) includes 1) a microphone to capture audio recorded by the user and 2) the controller (106) which matches an input audio signal to the user's voice print to authenticate the user.

In another example, the biometric second authentication system (622) uses a user's unique fingerprint to authenticate the user. In this example, the second authentication system (622) includes 1) a touchpad to capture the fingerprint of a user and 2) the controller (106) which matches a received fingerprint to a record of authorized finger prints. While specific reference is made to particular biometric authentication systems, other biometric information may be used to authenticate the user alongside the gaze tracking system (104).

In another example, the second authentication system (622) is a device authentication system. That is, the device through which access to the resource (FIG. 3, 314) is granted may be identified by a unique identifier. In this example, the second authentication system (622) includes a database of device identifiers that are authorized to provide access to the resource (FIG. 3, 314). In this example, the controller (106) may retrieve the device identifier and compare it against the database of authorized devices to determine, along with the eye movement authentication pattern (FIG. 3, 316), whether the user of the device is allowed access to the resource (FIG. 3, 314). Thus, the system (100) provides multiple authentication operations to increase the security of valuable resources (FIG. 3, 314).

Figure 7:
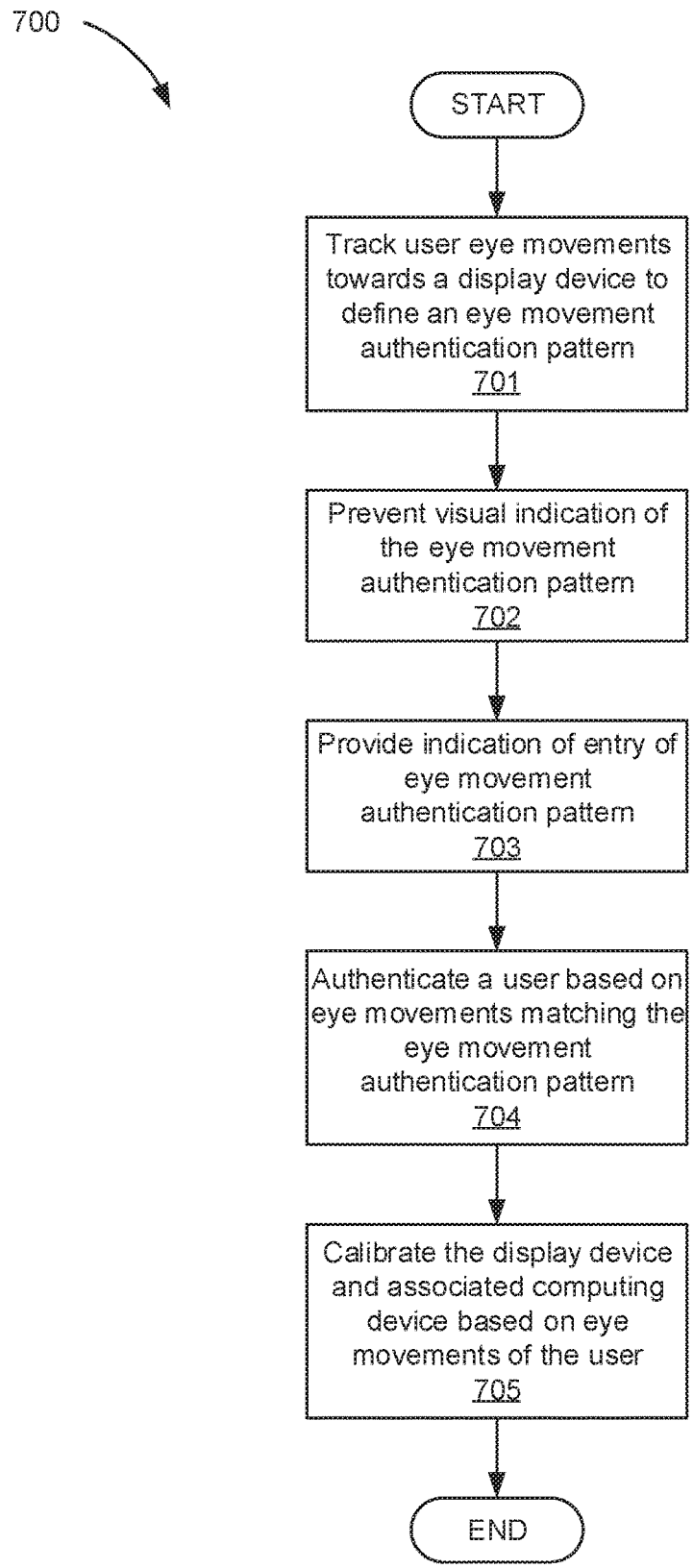
FIG. 7 is a flowchart of a method for authenticating and calibrating via gaze tracking, according to an example of the principles described herein.

FIG. 7 is a flowchart of a method (700) for authenticating and calibrating via gaze tracking, according to an example of the principles described herein. According to the method (700), user eye movements towards a display device (FIG. 1, 102) are tracked (block 701) to define an eye movement authentication pattern (FIG. 3, 316). This may be performed as described above in connection with FIG. 4.

To further increase the security of this operation, visual indication of eye movements may be prevented (block 702) from being displayed on the display device (FIG. 1, 102) or another display device. For example, it may be the case that the display device (FIG. 1, 102) is visible to other users. As a particular example, a second user may be standing behind a first user while the first user is creating or authenticating via the eye movement authentication pattern (FIG. 3, 316). Were the eye movements visually indicated on the display device (FIG. 1, 102), this second user may gain access to the eye movement authentication pattern (FIG. 3, 316) and could gain unauthorized access via entry of the eye movement authentication pattern (FIG. 3, 316). As another particular example, an enhanced reality headset (FIG. 2, 218) may be coupled to a mirrored display device, such as a computing desktop. Similarly, if a second user is in front of the mirrored display device while the first user is establishing or authenticating via the eye movement authentication pattern (FIG. 3, 316), the second user may get undesired access to the resource (FIG. 3, 314). Accordingly, by preventing (block 702) the display device (FIG. 1, 102) and/or another display device from visually indicating the eye movement, greater security of the resource (FIG. 3, 316) is provided.

However, in some examples, the method (700) includes providing (block 703) an indication, either auditory or visual, of entry of the eye movement, all without visually revealing the eye movement. That is, while the actual movements are not indicated, the fact that an eye movement was registered may be indicated. As a particular example, an audible beep may indicate that a point is chosen. As another example a counter may be established which updates each time a new eye movement is registered. Doing so allows the user to receive verification that an eye movement towards completing the eye movement authentication pattern (FIG. 3, 316) was received without revealing the eye movement authentication pattern (FIG. 3, 316) on the display device (FIG. 1, 102) or another display device.

The method (700) also includes simultaneously authenticating (block 704) the user based on eye movements matching the eye movement authentication pattern (FIG. 3, 316) and calibrating (block 705) the gaze tracking system (FIG. 1, 104) and associated computing device based on the same eye movements used to enter the eye movement authentication pattern (FIG. 3, 316). As used in the present specification and in the appended claims, the term "simultaneously" may indicate an overlap in time. These operations may be performed as described above in connection with FIG. 4.

Figure 8:
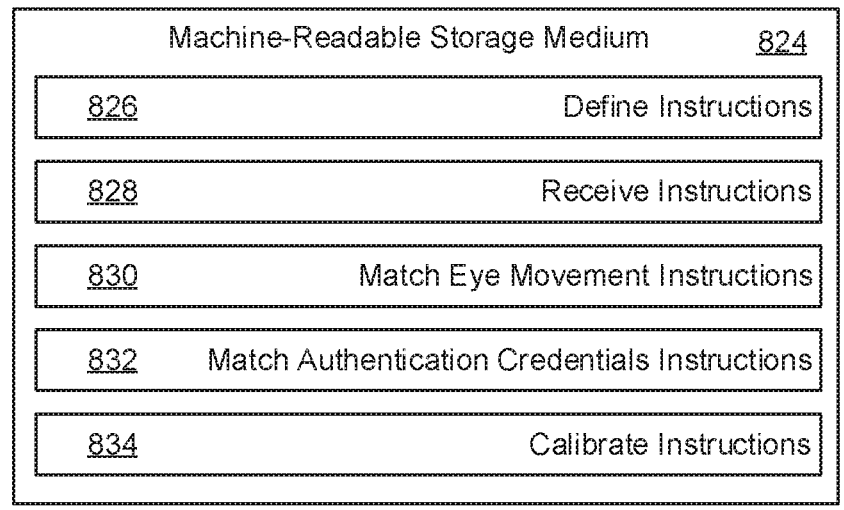
FIG. 8 depicts a non-transitory machine-readable storage medium for authenticating and calibrating via gaze tracking, according to an example of the principles described herein.

FIG. 8 depicts a non-transitory machine-readable storage medium (824) for authenticating and calibrating via gaze tracking, according to an example of the principles described herein. To achieve its desired functionality, a computing system includes various hardware components. Specifically, a computing system includes a processor and a machine-readable storage medium (824). The machine-readable storage medium (824) is communicatively coupled to the processor. The machine-readable storage medium (824) includes a number of instructions (826, 828, 830, 832, 834) for performing a designated function. The machine-readable storage medium (824) causes the processor to execute the designated function of the instructions (826, 828, 830, 832, 834). The machine-readable storage medium (824) can store data, programs, instructions, or any other machine-readable data that can be utilized to operate the system (FIG. 1, 100). Machine-readable storage medium (824) can store computer readable instructions that the processor of the controller (FIG. 1, 106) can process, or execute. The machine-readable storage medium (824) can be an electronic, magnetic, optical, or other physical storage device that contains or stores executable instructions. Machine-readable storage medium (824) may be, for example, Random Access Memory (RAM), an Electrically Erasable Programmable Read-Only Memory (EEPROM), a storage device, an optical disc, etc. The machine-readable storage medium (824) may be a non-transitory machine-readable storage medium (824).

Referring to FIG. 8, define instructions (826), when executed by the processor, cause the processor to, in a first mode, track user eye movements towards a display device (FIG. 1, 102) to define an eye movement authentication pattern (FIG. 3, 316). Receive instructions (828), when executed by the processor, cause the processor to, in the first mode, receive user input to define supporting authentication credentials (FIG. 3, 318) from a second authentication system (FIG. 6, 622).

Match eye movement instructions (830), when executed by the processor, cause the processor to, during login, authenticate a user by matching user eye movements to the eye movement authentication pattern (FIG. 3, 316). Match authentication credentials instructions (832), when executed by the processor, cause the processor to, during login, authenticate a user by matching user input to the supporting authentication credentials (FIG. 3, 318).

Calibrate instructions (834), when executed by the processor, cause the processor to, during authentication, calibrate the display device (FIG. 1, 102) and associated computing device based on eye movements of the user during login.

In summary, using such a system May 1) authenticate a user to increase data security; 2) authenticate during calibration; 3) facilitate authentication without removing an enhanced reality headset; and 4) provide hands-free user authentication. However, it is contemplated that the devices disclosed herein may address other matters and deficiencies in a number of technical areas.

The invention claimed is:

1. A system, comprising:
   a display device;
   a gaze tracking system to:
      detect, in response to capturing eye movements of a user looking at the display device, a direction where the user is looking; and
   a controller to:
      prompt the user to provide a voice identifier,
      capture the voice identifier,
      in response to authenticating the voice identifier, display an eye movement visual reference to prompt the user to provide the eye movements of the user,
      authenticate the user based on the eye movements of the user matching an eye movement authentication pattern,
      calibrate, in response to authenticating the user, a computing device based on the eye movements of the user, and
      prevent visual indication of the eye movement authentication pattern to a mirrored display device.

2. The system of claim 1, wherein, in a first mode:
   the gaze tracking system is to capture initial eye movements of the user to define the eye movement authentication pattern; and
   the controller is to establish the eye movement authentication pattern.

3. The system of claim 2, further comprising a second authentication system, wherein:
   during the first mode, the second authentication system is to receive user input to establish supporting authentication credentials, wherein the user input is voice input; and
   during login, the controller is to further authenticate the user based on the voice identifier matching the supporting authentication credentials.

4. The system of claim 3, wherein the second authentication system is a biometric authentication system.

5. The system of claim 1, wherein the display device is a head mounted display device.

6. The system of claim 1, wherein the display device is capable of being coupled to the mirrored display device.

7. The system of claim 1, wherein the controller is to prevent the visual indication from being displayed on the mirrored display device.

8. A method, comprising:
   in a first mode:
      tracking, by a gaze tracking system, initial eye movements of a user towards a display device to define an eye movement authentication pattern;
      receiving, by a second authentication system, user input of the user to establish supporting authentication credentials, wherein the user input is a voice print;
   in a second mode:
      performing two-form authentication of the user, by a controller, by:
         authenticating, by the controller via the second authentication system, the user of the display device based on an audio signal of the user captured by a microphone matching the voice print, and
         authenticating, by the controller, the user of the display device based on eye movements of the user captured by the gaze tracking system matching the eye movement authentication pattern; and
      calibrating, by the controller in response to authenticating the user, a computing device based on the eye movements of the user; and
   preventing visual indication of the eye movement authentication pattern to a mirrored display device.

9. The method of claim 8, further comprising displaying an eye movement visual reference.

10. The method of claim 8, further comprising providing at least one of an auditory and visual indication of entry of the eye movement authentication pattern without visually revealing the eye movement authentication pattern.

11. The method of claim 8, wherein the display device is capable of being coupled to the mirrored display device.

12. The method of claim 8, wherein the controller is to prevent the visual indication from being displayed on the mirrored display device.

13. The method of claim 8, further comprising providing a visual indication of entry of the eye movement authentication pattern without visually revealing the eye movement authentication pattern, the visual indication including a counter that updates each time a new eye movement is registered.

14. The method of claim 8, wherein authenticating the user based on the eye movements is initiated responsive to authenticating the user based on the audio signal matching the voice print.

15. A non-transitory machine-readable storage medium encoded with instructions executable by a processor, the machine-readable storage medium comprising instructions to:
 in a first mode:
  track, towards a display device to define an eye movement authentication pattern, initial eye movements of a user; and
  receive user input to define supporting authentication credentials from a second authentication system, the supporting authentication credentials including a voice print;
 during login, perform an authentication of the user by:
  capturing audio of the user via a microphone to provide an audio signal; and
  matching the audio signal to the voice print of the supporting authentication credentials;
  in response to matching the audio signal to the voice print, capturing eye movements of the user; and
  matching the eye movements of the user to the eye movement authentication pattern;
 in response to the authentication of the user,
  calibrate a computing device based on the eye movements of the user during the login; and
 prevent visual indication of the eye movement authentication pattern to a mirrored display device.

16. The non-transitory machine-readable storage medium of claim 15, further comprising instructions to associate the eye movement authentication pattern to the supporting authentication credentials such that the eye movement authentication pattern is retrieved on a further device where the supporting authentication credentials are input.

17. The non-transitory machine-readable storage medium of claim 15, wherein the display device is capable of being coupled to the mirrored display device.

18. The non-transitory machine-readable storage medium of claim 15, wherein the processor is to prevent the visual indication from being displayed on the mirrored display device.

19. The non-transitory machine-readable storage medium of claim 15, further comprising instructions to capture the eye movements of the user in response to matching the audio signal to the voice print.

\* \* \* \* \*